US012768478B2

(12) United States Patent
Kim et al.

(10) Patent No.: US 12,768,478 B2
(45) Date of Patent: Oct. 20, 2026

(54) BOP PIPE CONNECTION SYSTEM

(71) Applicant: KIM Co., Ltd., Changwon-si (KR)

(72) Inventors: Hong Min Kim, Busan (KR); Geum Je Park, Changwon-si (KR)

(73) Assignee: KIM CO., LTD., Changwon-si (KR)

( * ) Notice: Subject to any disclaimer, the term of this patent is extended or adjusted under 35 U.S.C. 154(b) by 0 days.

(21) Appl. No.: 19/248,473

(22) Filed: Jun. 25, 2025

(65) Prior Publication Data

US 2026/0201985 A1 Jul. 16, 2026

(30) Foreign Application Priority Data

Jan. 8, 2025 (KR) ........................ 10-2025-0002998

(51) Int. Cl.
*F16L 15/08* (2006.01)
*E21B 33/06* (2006.01)

(52) U.S. Cl.
CPC .............. *F16L 15/08* (2013.01); *E21B 33/06* (2013.01)

(58) Field of Classification Search
CPC ......... F16L 37/002; F16L 37/62; F16L 25/06; F16L 15/08; E21B 33/061; E21B 33/062; E21B 33/064
See application file for complete search history.

(56) References Cited

U.S. PATENT DOCUMENTS

| | | | | | |
|---|---|---|---|---|---|
| 3,442,540 | A * | 5/1969 | Dozier | E21B 41/04 | 403/291 |
| 4,183,189 | A * | 1/1980 | Keller | E02B 17/0004 | 285/912 |
| 4,372,026 | A * | 2/1983 | Mosing | E21B 19/164 | 81/57.2 |
| 4,476,897 | A * | 10/1984 | Morrill | E21B 43/013 | 137/271 |
| 4,579,372 | A * | 4/1986 | Morrill | F16L 37/002 | 285/920 |
| 5,024,467 | A * | 6/1991 | Truchet | F16L 37/002 | 285/365 |
| 5,471,739 | A * | 12/1995 | Fetzer | F16L 23/00 | 29/714 |
| 8,910,720 | B2 | 12/2014 | Aguirre et al. | | |
| 10,781,956 | B2 * | 9/2020 | Fraczek | E21B 17/073 | |
| 12,152,459 | B1 * | 11/2024 | Kroesen | E21B 33/06 | |
| 12,467,331 | B1 * | 11/2025 | Doran | E21B 33/06 | |
| 2020/0072012 | A1 * | 3/2020 | Angstmann | H02K 5/132 | |
| 2025/0263997 | A1 * | 8/2025 | Boulanger | E21B 33/061 | |

* cited by examiner

*Primary Examiner* — Aaron M Dunwoody

(74) *Attorney, Agent, or Firm* — Paratus Law Group, PLLC

(57) ABSTRACT

A BOP pipe connection system includes: a shaft formed in a circular trajectory in a plurality and rotated by an external force, and having a shaft screw thread formed on an outer circumferential surface; roller screws provided in a plurality on the outer circumferential surface of the shaft, and having roller screw threads formed on each outer circumferential surface so as to be gear-engaged with the shaft screw thread; a nut provided in contact with different roller screws, having nut screw threads along an inner surface so as to be gear-engaged with the roller screw threads, and moving up and down as the shaft rotates; and a moving part having a hollow cylindrical shape, connected to the nut, and moving up and down while pressing and fixing an outer circumferential surface of a pipe.

4 Claims, 8 Drawing Sheets

A

B

*-Prior Art-*

*-Prior Art-*

*-Prior Art-*

A

B

A

B

BOP PIPE CONNECTION SYSTEM

CROSS-REFERENCE TO RELATED APPLICATION

The present application claims priority to Korean Patent Application No. 10-2025-0002998 (filed Jan. 8, 2025), which is hereby incorporated by reference in its entirety.

BACKGROUND

The present invention relates to a BOP pipe connection system, and more specifically, to a BOP pipe connection system capable of operating the entire system even if some roller screws are damaged.

A BOP (Blowout Preventer) is a device used to prevent explosions or irregular discharge of fluids that may occur due to a sudden increase in pressure in a well (a hole in an oil field) during oil and gas drilling operations.

The blowout preventer is composed of several layers of valves and blocking systems to prevent a situation where pressure rises rapidly in the well and fluids are discharged uncontrollably.

Specifically, as shown in FIG. 1, in order to connect the lower pipe (P2) located in the well and the upper pipe (P2), as shown in FIG. 2, the upper pipe (P1) and the lower pipe (P2) are positioned to be connected, and then the hydraulic system (H) is operated. As shown in FIG. 3, as the hydraulic system (H) moves downward, it presses the fixing part (F), and the fixing part (F) presses and fixes the connection part of the upper pipe (P1) and the lower pipe (P2).

Conventionally, when a hydraulic drive device was applied, a number of additional facilities such as hydraulic cylinders, valves, and pumps were required for operation, and since it was installed and operated in the deep sea, there was a problem that excessive costs were incurred to repair it when a failure occurred.

PRIOR ART LITERATURE

Patent Literature (Patent Literature 1) U.S. Registered Patent US8910720

SUMMARY

The present invention solves the above-mentioned problems and provides a BOP pipe connection system that can be miniaturized without additional equipment.

In order to achieve the above object, the present invention is characterized by comprising: a shaft formed in a circular trajectory in a plurality and rotated by an external force, and having a shaft screw thread formed on an outer circumferential surface; roller screws provided in a plurality on the outer circumferential surface of the shaft, and having roller screw threads formed on each outer circumferential surface so as to be gear-engaged with the shaft screw thread; a nut provided in contact with different roller screws, having nut screw threads along an inner surface so as to be gear-engaged with the roller screw threads, and moving up and down as the shaft rotates; and a moving part having a hollow cylindrical shape, connected to the nut, moving up and down while pressing and fixing the outer circumferential surface of the pipe.

The present invention is characterized by further comprising: a gear located above the nut, fixed to and rotating with the shaft, and having gear screw threads formed on an outer circumferential surface; and a rotating part rotating by an external force, provided in contact with different gears, having a hollow cylindrical shape, and having rotation screw threads formed along an inner surface so as to be gear-engaged with the gear screw threads.

The present invention is characterized in that a U-clamp is provided in the moving part to fix the moving part and the nut.

The present invention is characterized in that a sensor for detecting the movement of the nut is provided on the shaft.

The present invention is characterized in that a clutch is provided between the gear and the roller screws on the shaft.

The BOP pipe connection system according to the present invention has the following effects.

Miniaturization and weight reduction are possible because only motors and roller screws need to be installed without additional equipment for operation.

Even if some roller screws fail, the entire system operates, so repair costs can be reduced, and it is simple to replace only the failed roller screws.

By using roller screws, the contact area is increased, and even if a large load occurs, such as an explosion in the BOP, it can be withstood.

DETAILED DESCRIPTION

Figure 1:
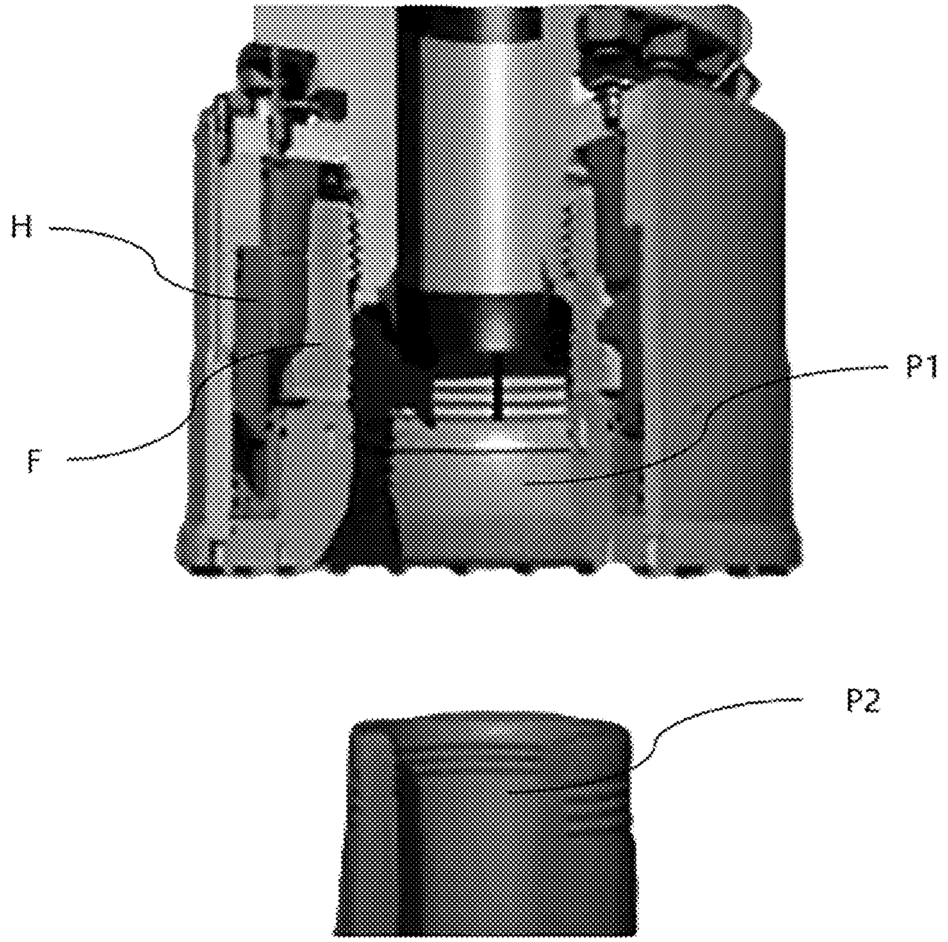
FIG. 1 is a view showing the prior art.
Figure 2:
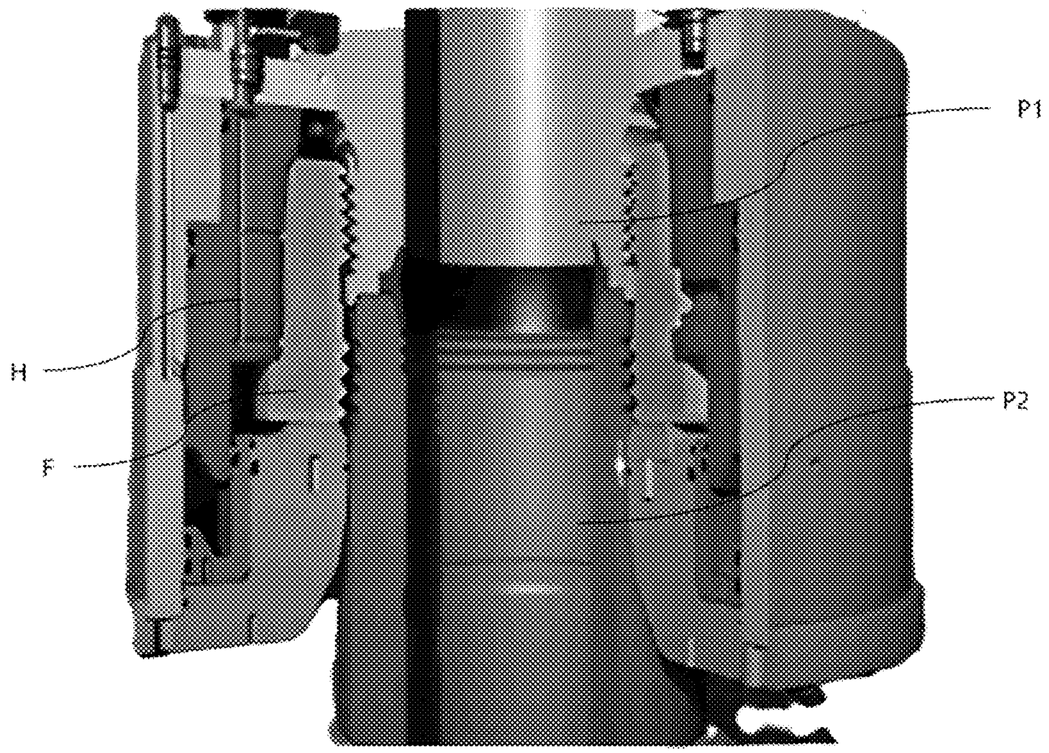
FIG. 2 is a view showing the prior art.
Figure 3:
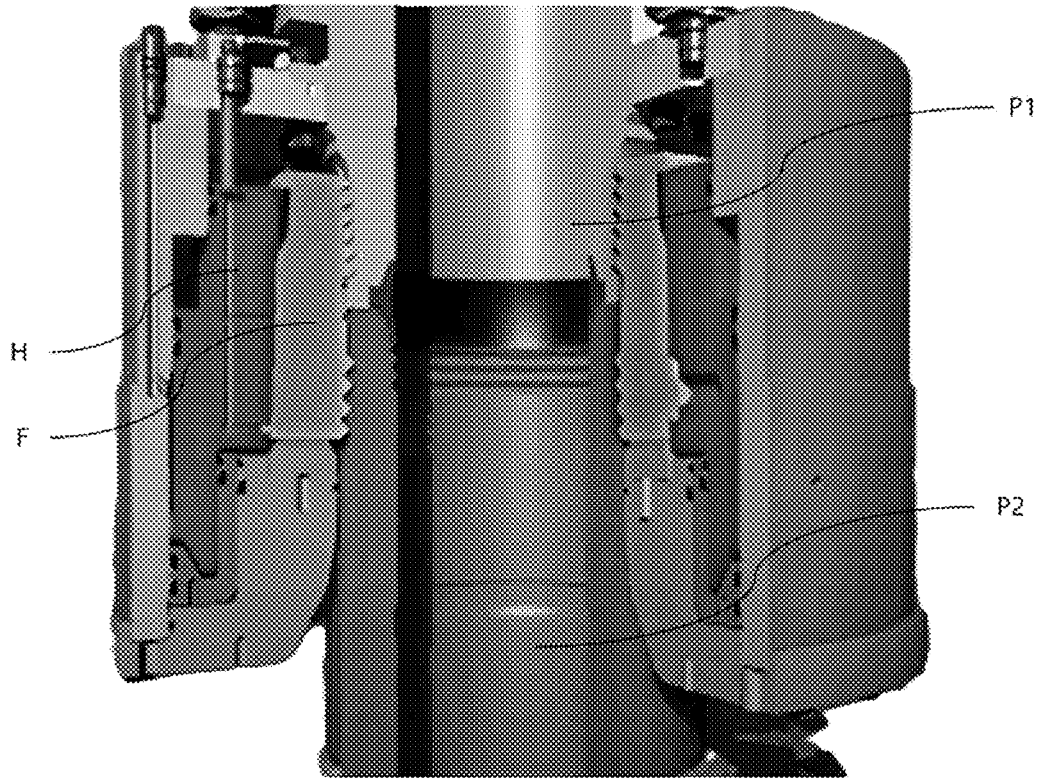
FIG. 3 is a view showing the prior art.

A preferred embodiment of the BOP pipe connection system according to the present invention will be described in detail with reference to the accompanying drawings.

The BOP pipe connection system according to the present invention includes a shaft (100) formed in a circular trajectory in a plurality and rotated by an external force, and having a shaft screw thread (110) formed on an outer circumferential surface, roller screws (200) provided in a plurality on the outer circumferential surface of the shaft (100), and having roller screw threads (210) formed on each outer circumferential surface so as to be gear-engaged with the shaft screw thread (110), a nut (300) provided in contact with different roller screws (200), having nut screw threads (310) along an inner surface so as to be gear-engaged with the roller screw threads (210), and moving up and down as the shaft (100) rotates, and a moving part (400) having a hollow cylindrical shape, connected to the nut (300), and moving up and down while pressing and fixing the outer circumferential surface of the pipe (P).

Figure 4:
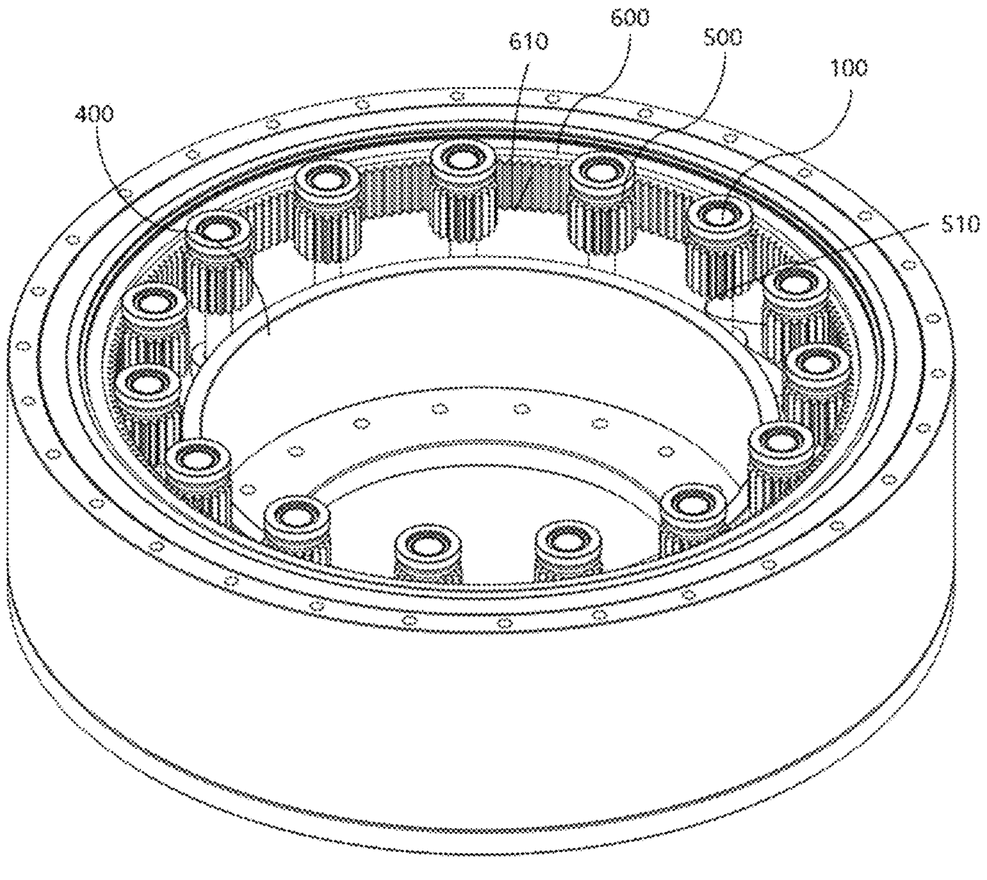
FIG. 4 is a perspective view showing a BOP pipe connection system according to the present invention.
Figure 5:
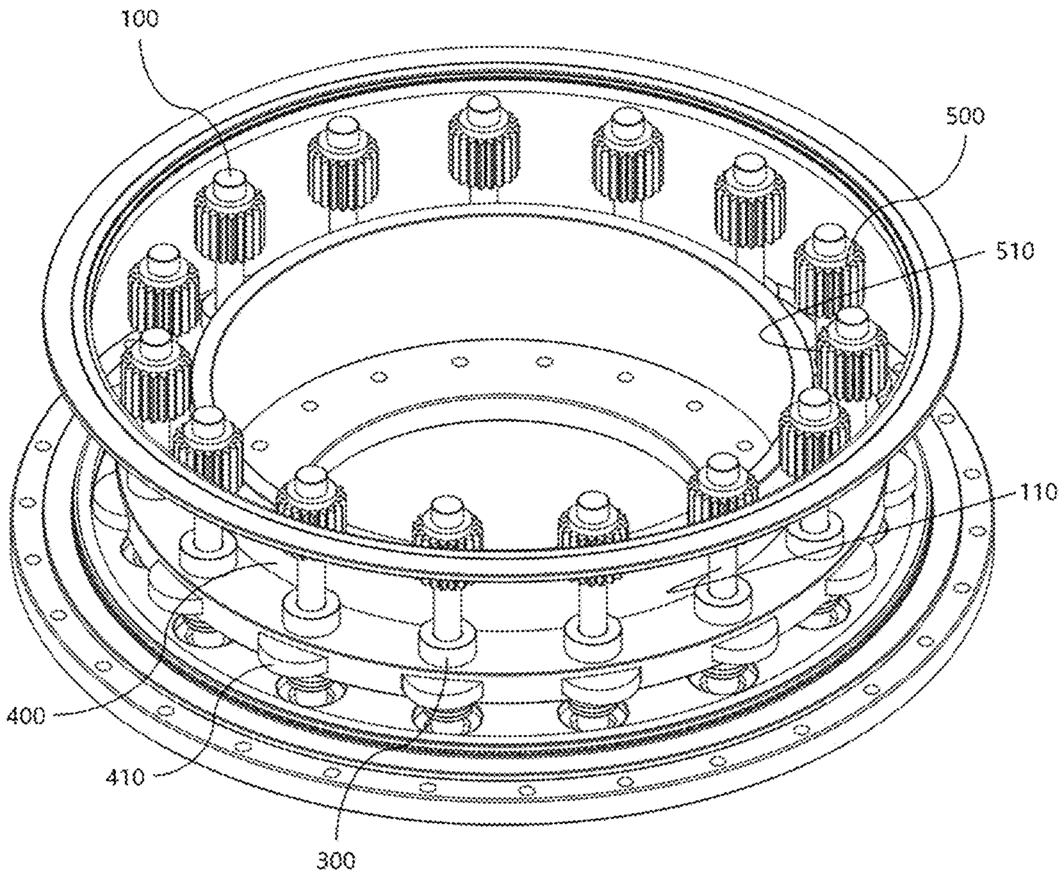
FIG. 5 is a view showing a part of the BOP pipe connection system according to the present invention.

First, the shaft (100) is provided. As shown in FIG. 4, the shaft (100) can be formed in a plurality in a circular trajectory.

Although FIG. 4 shows 15 shafts, the number and length are not limited.

At this time, each shaft (100) can be directly connected to a motor to receive power, and the capacity of the motor can be small, but it may be difficult to synchronize the control of different motors, making it difficult to rotate different shafts (100) simultaneously.

Shaft screw threads (110) are formed on the outer circumferential surface of the shaft (100), and the shaft screw threads (110) are formed at a constant pitch.

Figure 6:
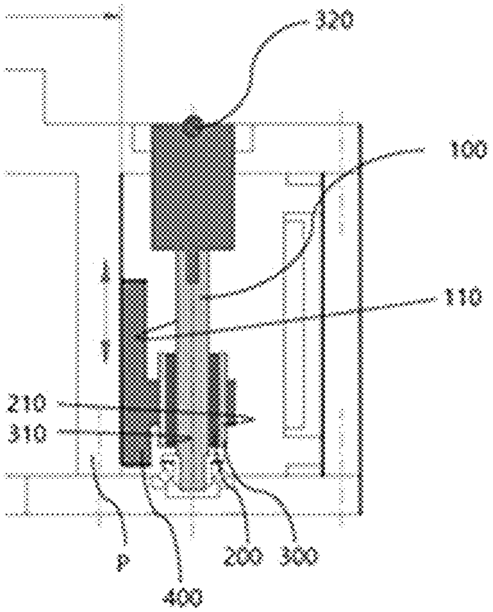
FIG. 6 is a cross-sectional view (A) of the BOP pipe connection system according to the present invention, and a cross-sectional view (B) of the nut.
Figure 6:
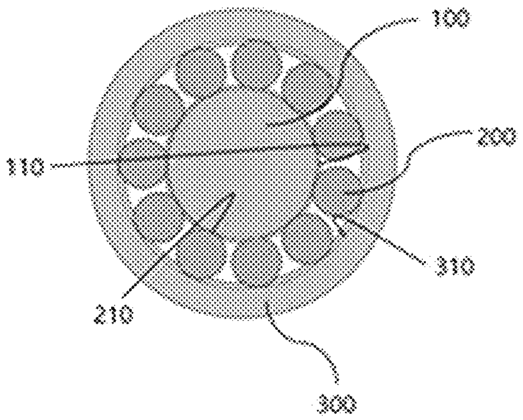
Figure 7:
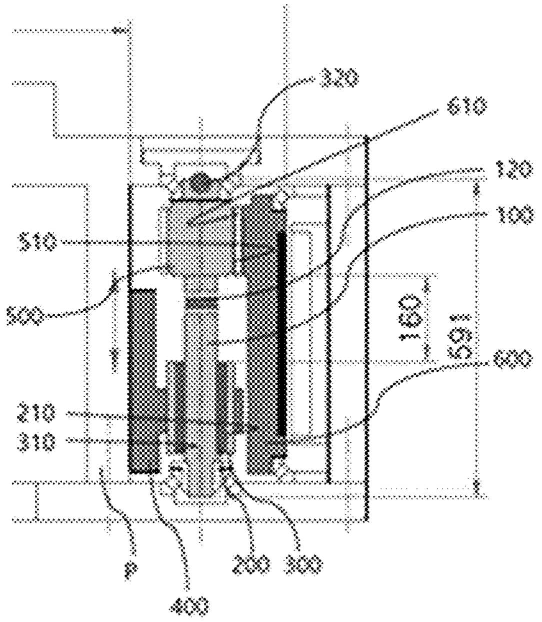
FIG. 7 is a cross-sectional view (A) and a cross-sectional view (B) of the nut for another embodiment of the BOP pipe connection system according to the present invention.
Figure 7:
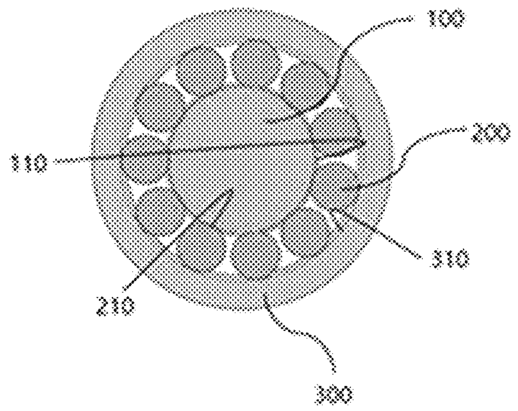

A plurality of roller screws (200) are formed on the outer circumferential surface of the shaft (100). Roller screw threads (210) are formed on each outer circumferential surface of the roller screws (200) so as to be gear-engaged with the shaft screw threads (110). Here, FIG. 6 shows 11 roller screws (200), but the number is not limited. The number and length of the roller screws (200) in the shaft (100) direction are not limited, but it is preferable that they are shorter than the length of the shaft (100). And the roller screw threads (210) are formed at a constant pitch.

The nut (300) is provided in contact with the roller screws (200). The nut (300) has a hollow cylindrical shape, and has nut screw threads (310) along the inner surface of the circular trajectory so as to be gear-engaged with the roller screw threads (210).

Here, the length of the nut (300) in the shaft (100) direction is not limited, and the nut screw threads (310) are formed at a constant pitch.

As the shaft (100) rotates, the roller screws (200) transmit rotational force to the nut (300), causing the nut (300) to move up and down.

A sensor (320) is further provided on the shaft (100). If a concentrated load is applied to some of the roller screws (200), and the roller screws (200) with the concentrated load among the different roller screws (200) are damaged, the nut (300) stops. At this time, the sensor (320) can detect when the nut (300) does not move when the shaft (100) rotates, and confirm the damaged roller screws (200) and the nut (300) among the different roller screws (200) and the nut (300).

A moving part (400) is provided connected to the nut (300). The moving part (400) has a hollow cylindrical shape, and a pipe (P) is located inside, and the moving part (400) can move up and down together with the nut (300).

Specifically, as the moving part (400) moves downward together with the nut (300), it can press and fix the outer circumferential surface of the connecting pipes (P) to connect different pipes (P). More specifically, as the moving part (400) moves downward, it presses the fixing part (F), and the fixing part (F) presses and fixes the outer circumferential surface of the pipe (P). By applying the roller screws (200), the contact area is increased and can withstand even if an explosion occurs.

Figure 8:
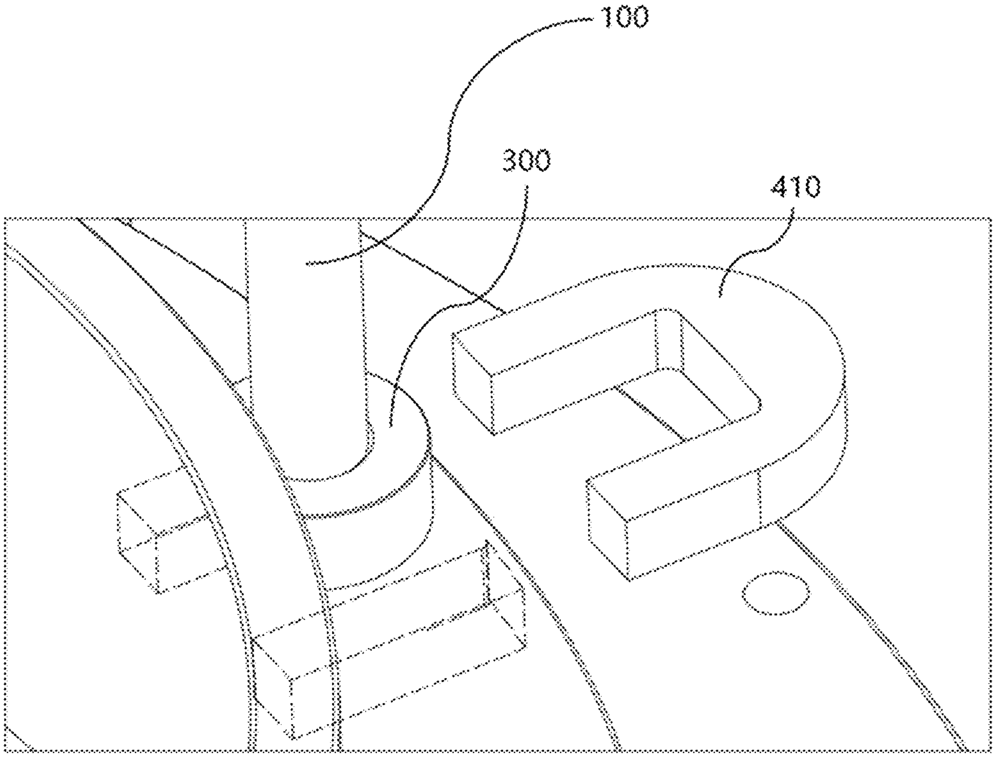
FIG. 8 is a view showing the installation state of the U-clamp in the BOP pipe connection system according to the present invention.

A U-clamp (410) is further provided in the moving part (400). Specifically, the U-clamp (410) is located on the outer circumferential surface of the moving part (400) to fix the moving part (400) and the nut (300) so that the moving part (400) can move together with the nut (300). <0036> Specifically, as shown in FIG. 8, grooves are formed on both sides of the nut (300) at positions corresponding to the U-clamp (410), so that the U-clamp (410) can fix the nut (300) to prevent rotation. And grooves are formed on the outer surface of the moving part (400) at positions corresponding to the U-clamp (410), so that the U-clamp (410) can be fitted into the moving part (400) to fix the nut (300) to the moving part (400).

If a concentrated load is applied to some of the roller screws (200), only the roller screws (200) with the concentrated load among the different roller screws (200) may be frequently damaged, causing the nut (300) to malfunction, and the damaged roller screws (200) and the nut (300) can be easily replaced by separating only the U-clamp (410) located on the damaged roller screws (200) and the nut (300).

Hereinafter, another embodiment of the BOP pipe connection system according to the present invention will be described.

First, the shaft (100) is provided. As shown in FIG. 4, the shaft (100) can be formed in a plurality in a circular trajectory.

Although FIG. 4 shows 15 shafts, the number and length are not limited.

And the shaft (100) rotates by an external force, and when the rotating part (600) described below is connected to a motor and the gear (500) connected to the rotating part (600) rotates, the shaft (100) can also rotate. At this time, it is possible to simultaneously rotate different shafts (100), but there is a problem that the capacity of the motor increases.

Shaft screw threads (110) are formed on the outer circumferential surface of the shaft (100), and the shaft screw threads (110) are formed at a constant pitch.

Furthermore, roller screws (200), nut (300), moving part (400), sensor (320), and U-clamp (410) are further provided, and since the above description is the same, detailed description will be omitted.

A gear (500) is provided above the nut (300). The gear (500) is fixed to the shaft (100) and rotates together with the shaft (100). And gear screw threads (510) are formed on the outer circumferential surface of the gear (500).

A rotating part (600) is provided connected to the gear (500). Specifically, it is located in contact with different gears (500). The rotating part (600) has a hollow cylindrical shape, and rotation screw threads (610) are formed along the inner surface so as to be gear-engaged with the gear screw threads (510).

Here, the rotating part (600) can receive power to rotate and transmit rotational force to the gear (500).

A clutch (120) is further provided on the shaft (100). The clutch (120) is located between the gear (500) and the roller screws (200). Specifically, when the roller screws (200) are damaged and the nut (300) does not operate, the clutch (120) located on the damaged roller screws (200) and the nut (300) is operated to disconnect the shaft (100) located on the roller screws (200) and the nut (300) from the shaft (100) located on the gear (500) so that the damaged roller screws (200) and the nut (300) no longer operate.

At this time, the operation of the clutch (120) can be electronically controlled.

Hereinafter, the operation of the BOP pipe connection system according to the present invention will be described.

When the motor connected to the shaft (100) operates, as the shaft (100) rotates, the roller screws (200) rotate and the nut (300) moves up and down.

At this time, as the moving part (400) moves downward together with the nut (300), it can press and fix the outer circumferential surface of the connecting pipes (P) to connect different pipes (P). More specifically, as the moving part (400) moves downward, it presses the fixing part (F), and the fixing part (F) presses and fixes the outer circumferential surface of the pipe (P). By applying the roller screws (200), the contact area is increased and can withstand even if an explosion occurs.

And, when the sensor (320) does not detect the movement of the nut (300), it is recognized that the nut (300) does not rotate due to a failure of the roller screws (200), and the clutch (120) located on the damaged roller screws (200) and the nut (300) is operated. The shaft (100) located on the roller screws (200) and the nut (300) is disconnected from the shaft (100) located on the gear (500) so that the damaged roller screws (200) and the nut (300) no longer operate.

In the present invention, since the roller screws (200) and the nut (300) are formed in a plurality on the outer circumferential surface of the moving part (400), even if some of them fail, the entire system operates so that the moving part (400) can move up and down, so there is no need to repair every time a failure occurs, thereby reducing costs.

And when repairing, if the U-clamp (410) is removed from the moving part (400), the roller screws (200) and the nut (300) come out of the moving part (400), so repair is also easy.

Hereinafter, the operation of another embodiment of the BOP pipe connection system according to the present invention will be described.

When the motor connected to the rotating part (600) operates, the rotating part (600) rotates, and the gear (500) transmits rotational force to the shaft (100), causing the shaft (100) to rotate. As the shaft (100) rotates, the roller screws (200) rotate and the nut (300) moves up and down.

At this time, as the moving part (400) moves downward together with the nut (300), it can press and fix the outer circumferential surface of the connecting pipes (P) to connect different pipes (P). More specifically, as the moving part (400) moves downward, it presses the fixing part (F), and the fixing part (F) presses and fixes the outer circumferential surface of the pipe (P). By applying the roller screws (200), the contact area is increased and can withstand even if an explosion occurs.

Hereinafter, the detailed description of detecting and repairing a failure is the same as the above description, so detailed description will be omitted.

As such, it will be understood by those skilled in the art to which the present invention pertains that the technical configuration described above can be implemented in other specific forms without changing the technical idea or essential features of the present invention.

Therefore, the embodiments described above are only exemplary in all aspects and are not limiting, and it should be understood that the scope of the present invention is indicated by the following claims rather than the detailed description above, and all changes or modified forms derived from the meaning, scope, and equivalent concept of the claims are to be interpreted as being included in the scope of the present invention.

DESCRIPTION OF SYMBOLS

100: shaft 110: shaft screw thread
120: clutch 200: roller screw
210: roller screw thread 300: nut
310: nut screw thread 320: sensor
400: moving part 410: U-clamp
500: gear 510: gear screw thread
600: rotating part 610: rotation screw thread
P: pipe P1: upper pipe
p P2: lower pipe H: hydraulic system
F: fixing part

The invention claimed is:

1. A BOP pipe connection system comprising:
a plurality of shafts arranged along a circular trajectory, each of the plurality of shafts being rotatable by an external, force and having a shaft screw thread formed on an outer circumferential surface thereof;
a plurality of roller screws provided on the outer circumferential surface of each of the plurality of shafts, each of the plurality of roller screws having a roller screw thread formed on an outer circumferential surface thereof so as to be gear-engaged with the shaft screw thread of the corresponding shaft;
a nut disposed to be in contact with each of the plurality of roller screws, the nut having a nut screw thread along an inner surface thereof so as to be gear-engaged with the roller screw thread, the nut configured to move up and down as the plurality of shafts rotate;
a moving part having a hollow cylindrical shape, connected to the nut, and moving up and down while pressing and fixing an outer circumferential surface of a pipe;
a gear fixed to and configured to rotate with each of the plurality of shafts, the gear being located at an upper portion of the shaft above the nut and having a gear screw thread formed on an outer circumferential surface thereof; and
a rotating part having a hollow cylindrical shape and disposed to be in contact with the gear fixed to each of the plurality of shafts, the rotating part having a rotation screw thread formed along an inner surface thereof so as to be gear-engaged with the gear screw thread.

2. The BOP pipe connection system of claim 1, wherein a U-clamp is provided in the moving part to fix the moving part and the nut.

3. The BOP pipe connection system of claim 1, wherein a sensor for detecting movement of the nut is provided on the shaft.

4. The BOP pipe connection system of claim 1, wherein a clutch is provided between the gear and the roller screws on the shaft.

* * * * *